Feb. 26, 1935.  J. L. KOUBEK  1,992,668
LENS OR COVER GLASS FOR HEAD LAMPS AND THE LIKE
Filed June 21, 1933   4 Sheets-Sheet 1
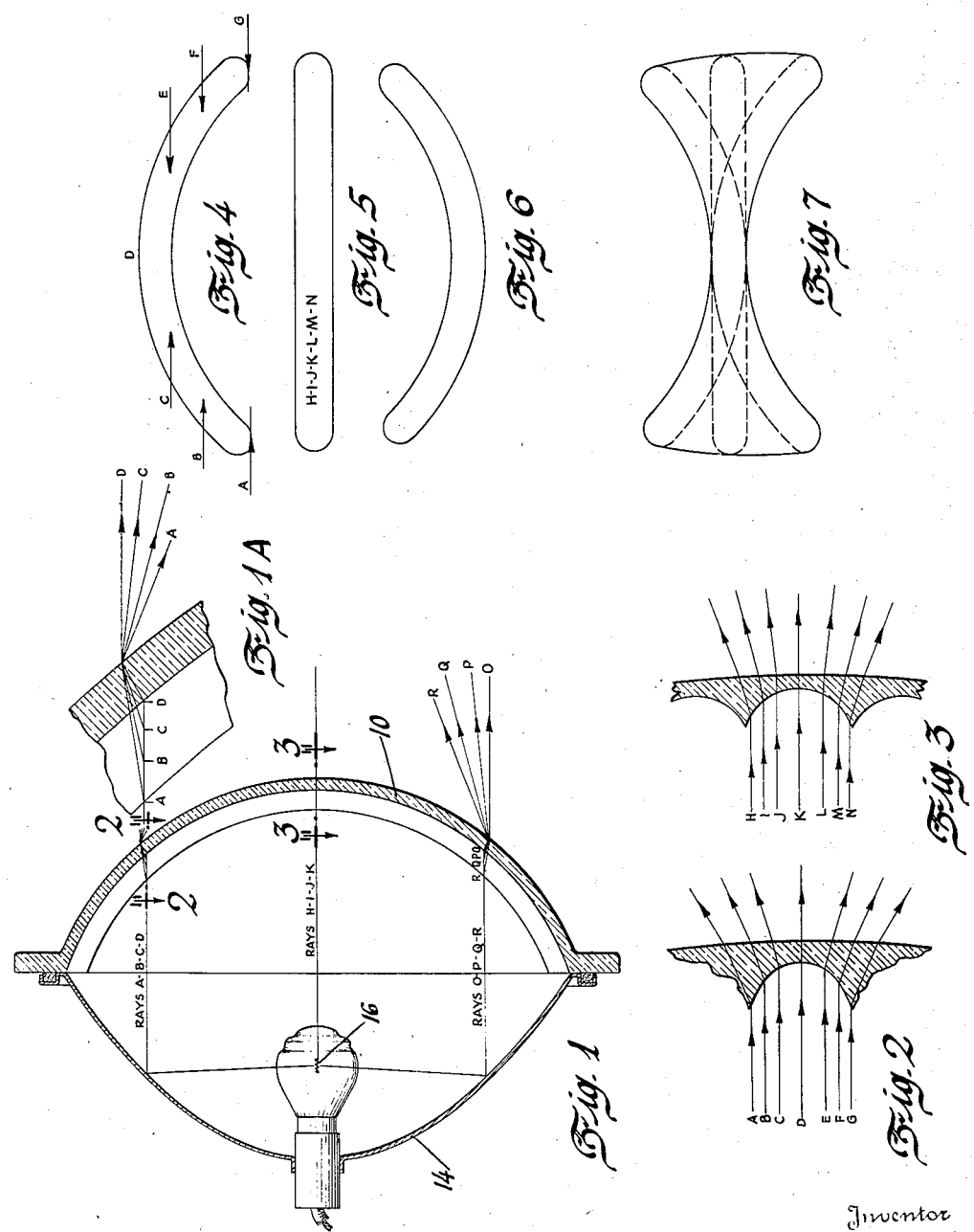
Inventor
John L. Koubek
By Blackmore, Spencer & Flick
Attorneys Feb. 26, 1935.  J. L. KOUBEK  1,992,668

LENS OR COVER GLASS FOR HEAD LAMPS AND THE LIKE

Filed June 21, 1933  4 Sheets-Sheet 2

Inventor
John L. Koubek

By Blackmore, Spencer & Hunt
Attorneys

Feb. 26, 1935.   J. L. KOUBEK   1,992,668
LENS OR COVER GLASS FOR HEAD LAMPS AND THE LIKE
Filed June 21, 1933   4 Sheets-Sheet 3
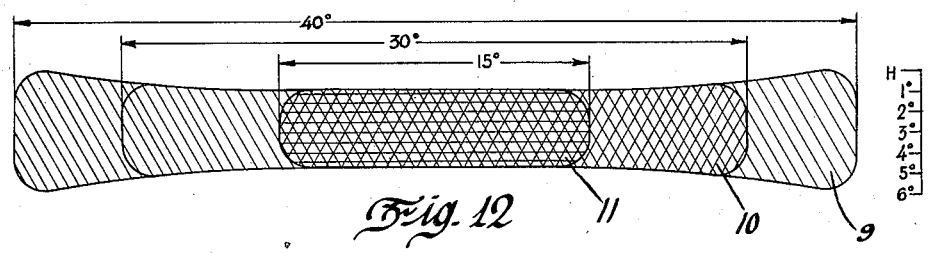
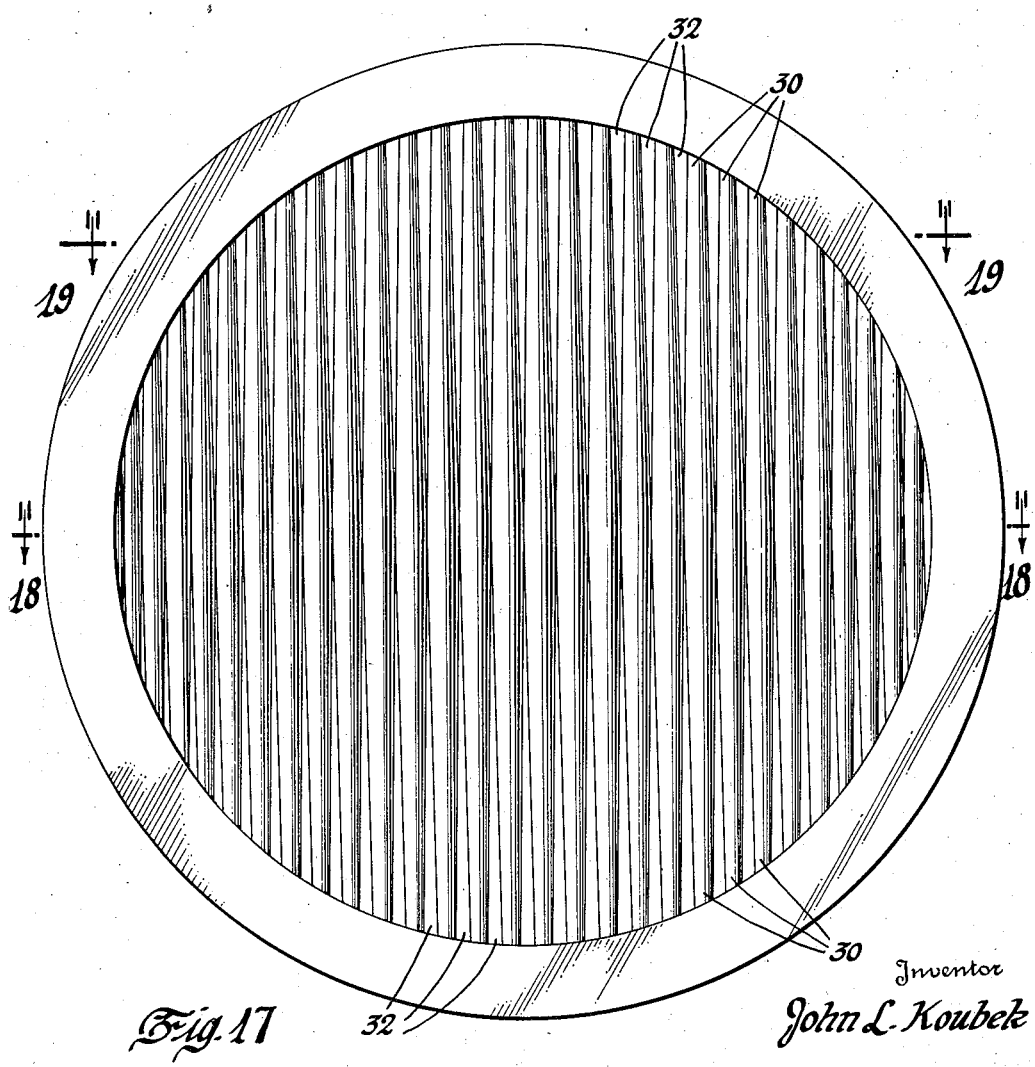

Feb. 26, 1935.   J. L. KOUBEK   1,992,668
LENS OR COVER GLASS FOR HEAD LAMPS AND THE LIKE
Filed June 21, 1933    4 Sheets-Sheet 4
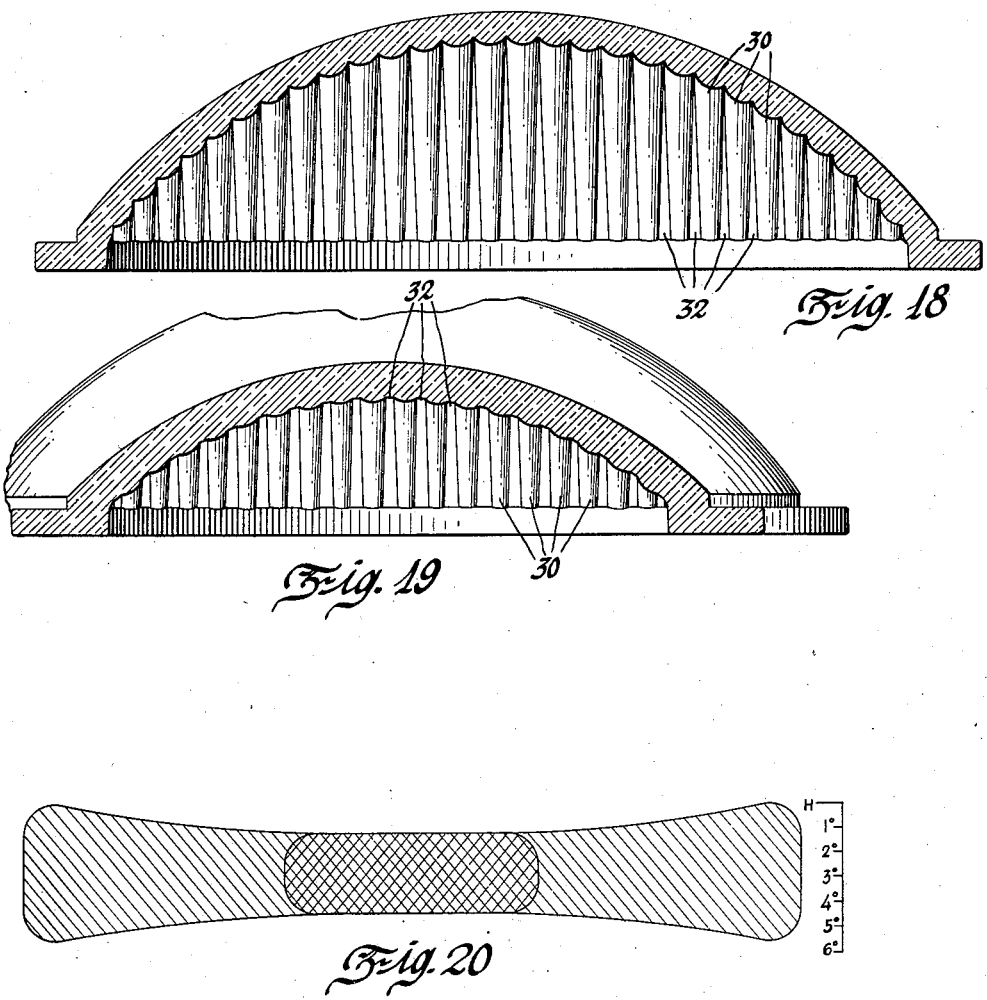
Inventor
John L. Koubek
By Blackmore, Spencer & Flint
Attorneys Patented Feb. 26, 1935

1,992,668

UNITED STATES PATENT OFFICE 1,992,668

LENS OR COVER GLASS FOR HEAD LAMPS AND THE LIKE

John L. Koubek, Anderson, Ind., assignor, by mesne assignments, to General Motors Corporation, Detroit, Mich., a corporation of Delaware Application June 21, 1933, Serial No. 676,821

7 Claims. (Cl. 240—41.4)

In my copending application Serial No. 679,296 filed July 7, 1933 I have analyzed the cause of the poor light distribution obtained from a curved lens provided with conventional vertically arranged light spreading flutes. When such arrangements are employed, the top of the lens projects a beam that is downwardly arched, and the bottom of the lens projects a beam that is upwardly arched, while the center of the lens projects a substantially horizontal beam. The complete beam from the lamp is of least depth at its central portion and of maximum depth at its ends. This type of beam is objectionable for the reason that the upwardly arched portions are directed above the horizontal cutoff, producing glare, while the center of the beam where the light is most concentrated is of too little depth to adequately illuminate the center foreground.

As set forth in that application I have found that this vertical dispersion of the rays results from similar vertical dispersion of perpendiculars drawn to the incident surface of the flutes. This becomes most evident on considering the vertical perpendiculars to the incident surface of the flutes along any horizontal plane above or below the lamp axis. I have also found that the amount of vertical distortion increases as the top or bottom of the lens is approached, and also increases with the amount of spread of the flutes.

In the application referred to I have disclosed a method of correcting the lens by canting the flutes. In the present application there is disclosed another method of overcoming the difficulty. This method consists in providing flutes of narrowest spread on the portions of the lens where the vertical dispersion is the greatest, and using flutes of increasing spread as the center of the lens is approached. By this means the dispersion is not completely corrected but its effects are minimized. The beam patterns projected by each of the horizontal strata of rays of which the total beam is composed will of course remain arched in form, but by reducing the horizontal spread of the rays from the portions of the lens in which the vertical distortion is greatest, the amount of distortion is held within such limits as to be unobjectionable.

In the drawings:

Figure 1 is a central vertical section through a headlamp equipped with a convex lens of small diameter and radius, provided with conventional concave flutes, the showing being somewhat diagrammatic to illustrate the problem which my invention solves.

Figure 1A is an enlarged detail of a portion of Figure 1.

Figure 2 is a section on line 2—2 of Figure 1.

Figure 3 is a section on line 3—3 of Figure 1.

Figures 4, 5 and 6 are views on a reduced scale showing the beams projected by certain of the rays passing through the lens of Figure 1.

Figure 7 shows the complete beam pattern produced by the lens of Figure 1.

Figure 12 is a view of the beam pattern produced by the lens of Figure 8.

Figure 17 shows a further modification.

Figures 18 and 19 are sections on the corresponding section lines of Figure 17.

Figure 20 shows the beam pattern produced by the lens of Figure 17.

Figure 21 is a section through a lens similar to the lens of Figure 17, but equipped with asymmetrical flutes.

Figure 8:
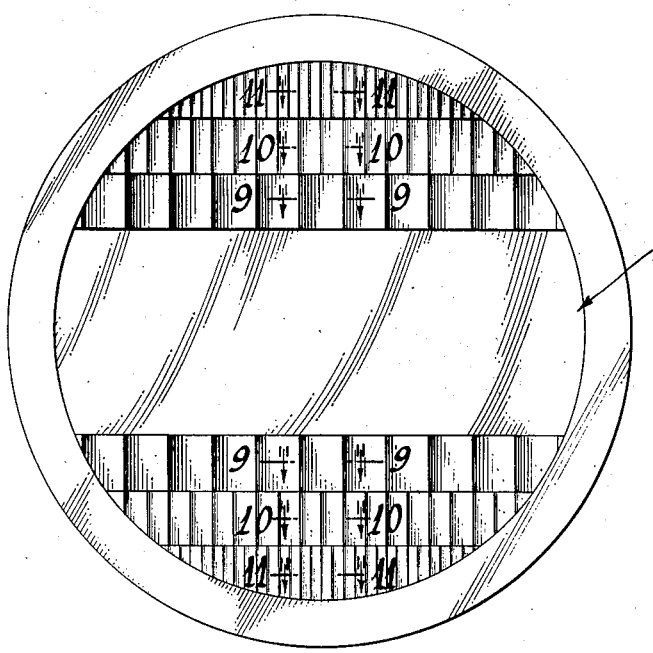
Figure 8 is a front view of a lens embodying my invention.
Figure 9:
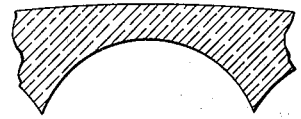
Figures 9, 10 and 11 are sections taken on the corresponding section lines of Figure 8.
Figure 10:
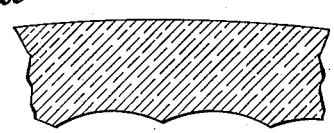
Figure 11:
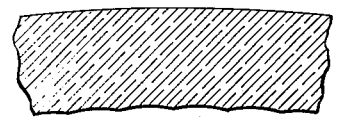
Figure 13:
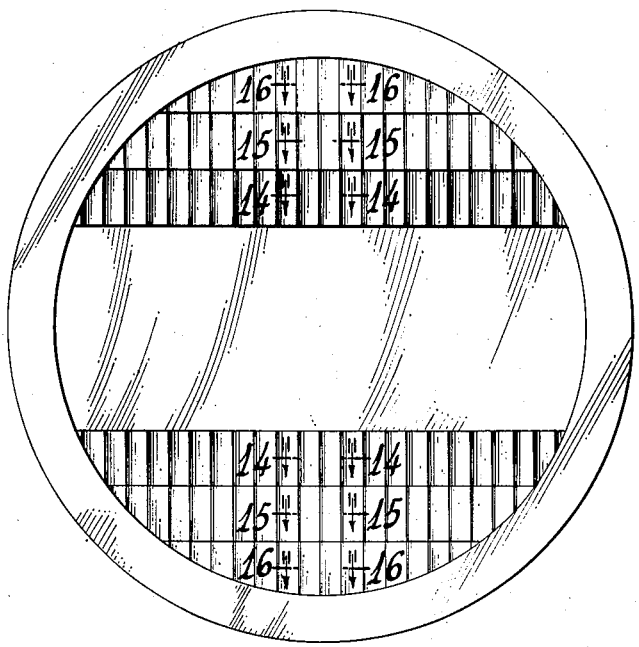
Figure 13 shows a modified form of lens.
Figure 14:
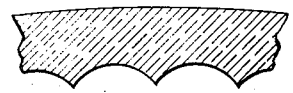
Figures 14, 15 and 16 are sections on the corresponding section lines of Figure 13.
Figure 15:
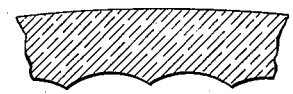
Figure 16:
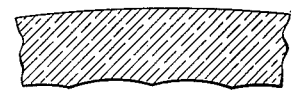

The lens or cover glass shown at 10 in Figure 1 is of conventional design and forms no part of my invention. This figure as well as Figures 2 to 7, inclusive, are used to illustrate the principles of optics involved in my invention. Lens 10 has the form of a segment of a sphere, and is provided on its interior with concave flutes as shown in Figures 2 and 3. The lamp also comprises a reflector 14 equipped with a light source 16 in the form of a filament arranged at the focus of the reflector. For the purpose of the present discussion the reflector and light source may be regarded simply as means for producing substantially parallel rays. In the conventional lamp used today several beams are projected, one high and one low, but so far as the principle of my invention is concerned, it is applicable to both beams, and performs in like manner with each of them so that it is sufficient to study the optics involved in the case of a lamp having but one light source.

I have indicated in Figure 3 rays lettered from H to N emitted from the lamp in a horizontal plane through the axis. These rays are spread horizontally, and produce a pattern such as shown in Figure 5. Owing to the fact that the rays are normal to the lens the action of the flutes is simply to spread the light as in the case of a conventional flat lens. While the flute section shown in Figure 3 has the form of an arc of a circle the section shown in Figure 2 is substantially elliptical producing greater spread of the light. This follows from the well known fact that when a cylinder is intersected by a plane at other than a right angle the resulting section is an ellipse. This additional spread somewhat changes the form of the beam projected by the lamp but I have found in practice that this effect may be sufficiently controlled by selecting a suitable radius of curvature for the flutes, or by employing flutes of different radii of curvature in different parts of the lens.

In Figure 2 I have shown rays A to G, inclusive, proceeding from the reflector in a horizontal plane above the lamp axis and spread laterally by the action of the flute. However, in the case of these rays the flutes also produce dispersion of the rays in a vertical plane as shown by the beam pattern of Figure 4. In Figure 1A I have shown the vertical dispersion produced by the flute of Figure 2 on rays A, B, C and D, projected in the same horizontal plane but incident to the flute surface at different distances from the flute center line. It will be noted that ray D emerges from the lens at about the same vertical angle that it entered. It is slightly displaced in a vertical direction as a result of refraction. This is because the ray passes through the flute at its mid-portion where the sides of the lens are substantially parallel. Rays A, B and C, however, are bent downwardly by varying amounts as indicated on the drawings. Ray A nearest the edge of the flute is deflected downwardly the greatest amount, and in general the amount of downward deflection increases with the distance from the flute center line.

The consequence of this dispersion of rays in a vertical plane is shown in Figure 4. It will be noted that the beam pattern is in the form of a rainbow, and that the extreme ends of the pattern are produced by the rays passing through the portions of the flutes nearest the edges.

Referring to the bottom of Figure 1 I have shown in like manner that rays O, P, Q, R are not only spread in a horizontal plane by the flutes but are dispersed in a vertical direction, the result being that these rays produce the pattern shown in Figure 6 having the form of an inverted rainbow. Again the extreme ends of the pattern are produced by the rays passing through the edge portions of the flutes, and the upward bending of the rays increases with the distance from the flute center line.

I have shown in Figure 5 that the beam pattern produced by rays passing through the central horizontal plane of the lens is substantially flat, while the beam pattern produced by rays passing through the lens in horizontal planes above the axis, as shown in Figure 4, is arched downwardly and the beam pattern produced by rays passing through the lens in horizontal planes below the axis, as shown in Figure 6, is arched upwardly. While I have shown but three patterns to illustrate this principle, it will be understood that the same action takes place with respect to each of the parallel strata of rays of which we may imagine the beam to be composed. It is important to note that the curvature of the patterns increases with the distance of the strata from the lamp axis.

In Figure 7 I have shown the complete beam pattern projected by the lamp of Figure 1. This pattern is of least depth at the middle portion and is of greatest depth at the ends. A considerable amount of light at the ends of the beams will consequently be projected above the horizontal cutoff, causing objectionable glare. The depth of the center of the beam is likewise less than is desired to give adequate illumination to the center foreground. For these reasons the beam pattern of Figure 7 is unsuitable for use, and the problem is presented of so designing the lens as to produce the desired substantially horizontal pattern.

I have succeeded in reducing the vertical dispersion of the lenses to such an amount as to be unobjectionable by employing flutes of graduated spread, the flutes of the least spread being located at the top and bottom of the lens, while the flutes of greater spread are located nearer the lens axis. The spread of the flutes may be varied either by changing the radius of curvature or the width of the flute, or by a combination of these changes.

In the lens shown in Figures 8 to 11 the spread has been varied by changing the width of the flutes. As shown in these figures the narrowest flutes are at the top and bottom of the lens and the flutes increase in width as the center of the lens is approached.

The central zone 20 may be treated with flutes in any desired manner for the beam projected from this zone is substantially horizontal. I may follow conventional practice using flutes of less spread over the sides of the central zone than over the center.

In Figure 12 I have shown the beam pattern produced by the lens of Figure 8. The portion of the pattern marked 11 is produced by the section 11 of the lens. The portion of the pattern marked 10 is produced by section 10 of the lens, and the portion of the pattern marked 9 is produced by the section 9 of the lens. For simplicity I have omitted the pattern produced by the central zone 20 of the lens. The light from this zone will be distributed in a substantially horizontal spot or band and may be spread as much as desired. It will be noted that the illustrated portions of the beam pattern are marked by slight curvature but by employing flutes of graduated spread the amount of curvature is held within limits which are unobjectionable.

The same optical results may be accomplished by the lens shown in Figures 13 to 16. Here the variation in spread is accomplished by employing flutes of different radii of curvature, the flutes of greatest curvature being nearest the center of the lens. Obviously, it is possible to obtain the same results by combination of variations in flute curvature and flute width, but the same principle must be employed, that is, the flutes of least spread must be employed at top and bottom of the lens. Even this however is subject to modification in practice, for in some cases the rainbow shaped pattern projected by the top of the lens may be unobjectionable, and in this event the correction need be applied but to the bottom of the lens.

In Figures 17 to 19 I have shown a further modification. Here the flutes 30 are of the same radius of curvature but of reduced width as the top and bottom of the lens are approached. The flutes 32 arranged between the flutes 30 are of wedge-shape, increasing in width with the distance from the horizontal lamp axis. It will be obvious that with this arrangement the correction is made by using flutes of reduced width at the top and bottom of the lens so that this is really but an application of the principle of design illustrated by the lens of Figure 8. An advantage of this design resides in the fact that the supplemental wedge-shaped flutes 32 may be formed on the plunger which gives shape to the glass, by simple machining operations. The machining is easiest in the case of a plunger made to produce convex flutes. The supplemental flutes 32 may have any desired configuration, either convex, concave, or flat, or in the case of an asymmetrical lens they may be given an asymmetrical shape as shown at 32' in Figure 21.

Figure 20 shows the beam pattern produced by the lens of Figures 17 to 19. The pattern is wider at the ends than in the middle owing to the vertical dispersion, which is minimized and not completely removed by this method of correction. The central part of the beam is strengthened by the light passing through the wedge-shaped flutes 32. The spread of these flutes is so slight that the effect of vertical dispersion is negligible.

It is obvious that the construction shown in Figure 17 may be further refined by providing additional wedge-shaped flutes between those illustrated, this being done by simply removing the sharp edges between the main and supplemental flutes 30 and 32.

My invention is capable of wide use and considerable modification. It may be applied to cover glasses free of down-bending prisms, or may be used with cover glasses equipped with this type of prism. If such prisms are used they will preferably be such as to throw down light from the top and bottom sections of the lamp so that the light from the top of the beam comes from the central section, and this light may be dropped down upon going to a filament above focus in accordance with well known lighting principles.

My invention may be employed with lenses of simple spherical curvature or with lenses having compound curvatures. This method of correction may be applied to the entire lens, or, if preferred, to only certain portions of the lens, either the top or the bottom, or portions thereof.

The form of the invention shown in Figure 17 is characterized by continuous reduction in width of flutes, and obviously the theoretical possibility is also presented of using flutes whose radii of curvature increase continuously as the center of the lens is approached, although such design would be difficult to manufacture.

I have described this invention as applicable to automobile head lamps, and have accordingly referred to top and bottom. However my lenses may find use for airway beacons, marine lighting, or the like, and, in such event, the directions may be other than those given. Hence it should be understood that the descriptions herein with respect to directions are to be construed in a relative sense only, for obviously the principle of my invention is the same whatever the plane of projection of the rays.

I claim:

1. A concavo-convex cover glass for headlamps provided with substantially vertical flutes across substantially the full horizontal width of the lens and extending from its top and bottom margins toward a horizontal diameter through the lens, the spread of each of said flutes increasing as the horizontal diameter is approached.

2. A curved cover glass for lamps provided with substantially vertically extending flutes of maximum width nearer the horizontal diameter through the lens and tapering to a minimum width at top and bottom of the lens, said flutes being separated by supplemental flutes of minimum width adjacent said horizontal diameter and increasing to maximum width at top and bottom of the lens.

3. A curved cover glass for lamps provided with substantially vertical extending major and minor flutes, each major flute formed by one radius of curvature and decreasing in width from the central portion of the lens to the outer diameter, and each minor flute formed by one radius of curvature and increasing in width from the central portion of the lens to the extremity.

4. A curved cover glass for headlamps comprising superimposed transversely extending top, bottom and intermediate zones, one of said first-named zones being provided with substantially vertically extending flutes of graduated spread, the spread of the flutes adjacent the intermediate zone being greater than at points more remote therefrom to correct for vertical dispersion of the light rays.

5. A curved cover glass for headlamps comprising superimposed transversely extending top, bottom and intermediate zones, said top and bottom zones being provided with substantially vertically extending flutes of graduated spread, the spread of the flutes adjacent the intermediate zone being greater than at points more remote therefrom to correct for vertical dispersion of the light rays.

6. A curved cover glass for headlamps comprising superimposed transversely extending top, bottom and intermediate zones, one of said first named zones being provided with substantially vertically extending flutes arranged in transversely extending zones of graduated spread, the flutes adjacent the intermediate zone having greater spread than those more remote therefrom to correct for vertical dispersion of the light rays.

7. A curved cover glass for headlamps comprising superimposed transversely extending top, bottom and intermediate zones, said top and bottom zones being provided with substantially vertically extending flutes arranged in transversely extending zones of graduated spread, the flutes adjacent the intermediate zone having greater spread than those more remote therefrom to correct for vertical dispersion of the light rays.

JOHN L. KOUBEK.